United States Patent [19]

Klee, Jr.

[11] Patent Number: 4,525,338

[45] Date of Patent: Jun. 25, 1985

[54] METHOD FOR REMOVAL OF HYDROGEN SULFIDE

[75] Inventor: Howard W. Klee, Jr., Naperville, Ill.

[73] Assignee: Chevron Research Company, San Francisco, Calif.

[21] Appl. No.: 618,456

[22] Filed: Jun. 7, 1984

Related U.S. Application Data

[63] Continuation-in-part of Ser. No. 462,679, Jan. 31, 1983.

[51] Int. Cl.³ .................... B01D 53/34; C01B 17/04
[52] U.S. Cl. ............................ 423/573 G; 423/226
[58] Field of Search .............. 423/224, 226, 573 G, 423/573 R

[56] References Cited

U.S. PATENT DOCUMENTS

| | | | |
|---|---|---|---|
| 2,772,146 | 11/1956 | Pippig | 423/573 |
| 3,068,065 | 12/1962 | Hartley et al. | 423/573 |
| 3,097,925 | 7/1963 | Pitts et al. | 423/573 |
| 3,933,993 | 1/1976 | Salemme | 423/573 |
| 4,009,251 | 2/1977 | Meuly | 423/573 G |
| 4,036,942 | 7/1977 | Sibeub et al. | 423/573 |
| 4,060,594 | 11/1977 | Fenton et al. | 423/573 R |
| 4,083,945 | 4/1978 | Fenton et al. | 423/573 R |
| 4,206,194 | 6/1980 | Fenton et al. | 423/573 R |
| 4,243,648 | 1/1981 | Fenton | 423/573 R |
| 4,278,646 | 7/1981 | Lynn et al. | 423/226 |
| 4,315,903 | 2/1982 | Fenton et al. | 423/573 R |
| 4,390,516 | 6/1983 | Blytas | 423/573 R |
| 4,393,037 | 7/1983 | Delaney et al. | 423/573 R |
| 4,401,642 | 8/1983 | Blytas et al. | 423/573 G |

Primary Examiner—John Doll
Assistant Examiner—Wayne A. Langel
Attorney, Agent, or Firm—Burns, Doane, Swecker & Mathis

[57] ABSTRACT

A two stage process for removing and subsequently recovering sulfur values from hydrogen sulfide or mercaptan-contaminated feed gas streams is disclosed. The process employs a polyvalent metal ion chelate redox couple to convert $S^{--}$ to $S$ and uses the metal ion reoxidation gas stream to remove the solid sulfur overhead as a flotation froth. The feed gas stream is contacted with the chelate in a first contacting zone, and additionally in the reoxidation zone.

7 Claims, 2 Drawing Figures

METHOD FOR REMOVAL OF HYDROGEN SULFIDE

REFERENCE TO PRIOR APPLICATION

This is a continuation-in-part of patent application U.S. Ser. No. 462,679, filed Jan. 31, 1983.

BACKGROUND OF THE INVENTION

1. Field of the Invention

This invention relates to an improved process for removing hydrogen sulfide from gases. More particularly, it concerns an improved continuous process for converting hydrogen sulfide contained in gases to elemental sulfur and thereafter removing the elemental sulfur.

2. The Prior Art

The removal of hydrogen sulfide from liquid and gaseous streams, such as the waste gases liberated or generated in the course of various industrial chemical processes, for example, in the pulping of wood, and in petroleum refining, has become increasingly important in combating atmospheric pollution. Such waste gases not only have an offensive odor, but they may also cause damage and constitute a health hazard. It is now imperative in many localities to remove virtually all of the hydrogen sulfide from waste streams under the penalty of an absolute ban on continuing operation of the plant.

The use of chelated iron redox catalysts for the oxidative removal of hydrogen sulfide from gas streams and conversion of the hydrogen sulfide to elemental sulfur is well known in the art. In such processes, a gas stream containing hydrogen sulfide is contacted with an aqueous solution of chelated ferric ion. The solution absorbs the hydrogen sulfide and converts it essentially quantitatively to elemental sulfur. The ferric ion which is reduced to ferrous ion by reaction with the hydrogen sulfide is then regenerated by contacting the solution with a gas containing elemental oxygen, such as air.

Representative disclosures of this process or variations upon it can be found in the following patents: U.S. Pat. No. 4,401,642, U.S. Pat. No. 4,393,037, U.S. Pat. No. 4,243,648, U.S. Pat. No. 4,036,942, U.S. Pat. No. 4,390,516, U.S. Pat. No. 4,315,403, U.S. Pat. No. 4,206,194, and U.S. Pat. No. 4,083,945. Other disclosures of interest can be found in U.S. Pat. No. 3,097,925 issued to Pitts Jr., et al, on July 16, 1963, U.S. Pat. No. 3,068,065 issued to Hartley, et al, on Dec. 11, 1962, U.S. Pat. No. 4,278,646, issued to Lynn, et al on July 14, 1981, U.S. Pat. No. 4,036,942 issued to Sibeud, et al, on July 19, 1977, U.S. Pat. No. 3,933,993 issued to Salemme on Jan. 20, 1976 and U.S. Pat. No. 4,009,251, issued to Meuly on Feb. 22, 1977. In general, these processes employ two separate zones - a first absorber zone for converting the $H_2S$ to solid sulfur by reaction with metal ion and a second oxidizer zone for regenerating the metal ion.

In these and other patents, the solid particulate sulfur is generally removed from the suspension by flotation or by a gravity-sedimentation mechanism such as filtration, centrifugation or the like. Alternatively, the sulfur is heated until it melts and is removed as a liquid. In the latter cases the separation relies upon sulfur's specific gravity of $2.00\pm0.05$ to carry the sulfur down and the aqueous liquid up. The gravity drawn sedimentation processes can have problems. The solid sulfur can cake and build up in the sedimentation zone. It can plug filter media and generally pose difficulties. Melting the sulfur can also have problems. The high temperature can degrade the chelate solution. Molten sulfur can freeze up and present special handling problems.

There is a need for an efficient process which can reduce $H_2S$ to 1 ppm or below and permit the efficient recovery of solid sulfur.

STATEMENT OF THE INVENTION

It has now been found that sulfur values can be recovered from a hydrogen sulfide-containing gaseous stream with high efficiency by the process of (a) contacting the hydrogen sulfide-containing gaseous stream with an aqueous solution of a water-soluble oxidized polyvalent metal chelate catalyst at alkaline pH thereby converting a substantial portion of the hydrogen sulfide to particulate elemental sulfur and reducing the polyvalent metal chelate catalyst and forming a suspension of particulate elemental sulfur in the aqueous solution and a first product gas stream depleted in hydrogen sulfide, (b) contacting the suspension with free oxygen-containing gas in an oxidation zone under flotation conditions thereby oxidizing the polyvalent metal chelate to its oxidized form and forming a regenerated aqueous solution and introducing into the same oxidation zone into contact with the regenerated aqueous solution the first product gas stream thereby converting remaining hydrogen sulfide in said first product gas stream to elemental sulfur and forming a second product gas stream doubly depleted in hydrogen sulfide and an aqueous liquid phase containing the oxidized polyvalent metal chelate catalyst and a sulfur particle-gas-liquid foam phase, (c) separating the foam phase from the aqueous liquid phase, (d) recycling at least a portion of the aqueous liquid phase to the contacting step of (a), and (e) recovering elemental sulfur from the foam phase.

In this process the solid sulfur produced by polyvalent metal chelate-catalyzed conversion of hydrogen sulfide is effectively recovered by flotation wherein the flotation gas is an oxygen-containing gas employed to regenerate the metal chelate catalyst.

In accord with this invention, sulfur values are recovered from a hydrogen sulfide containing gaseous stream by: (a) contacting the stream with an aqueous solution of a water-soluble oxidized polyvalent metal chelate catalyst at an alkaline pH thereby converting the hydrogen sulfide to particulate elemental sulfur and forming a reduced-sulfur content gas phase, reducing the metal of the metal chelate catalyst and forming a suspension of the sulfur in the aqueous solution, (b) contacting the suspension with free oxygen-containing gas under flotation conditions to oxidize the polyvalent metal chelate to its oxidized state and recontacting the reduced sulfur content gas phase with the oxidized chelate to remove additional hydrogen sulfide and form a sulfur particle-rich gas-solid-liquid foam phase and a sulfur particle poor aqueous liquid phase, (c) separating the foam phase and recovering solid sulfur from it and recycling at least a portion of the aqueous liquid phase to the contacting of step (a).

DETAILED DESCRIPTION OF THE INVENTION

Figure 1:
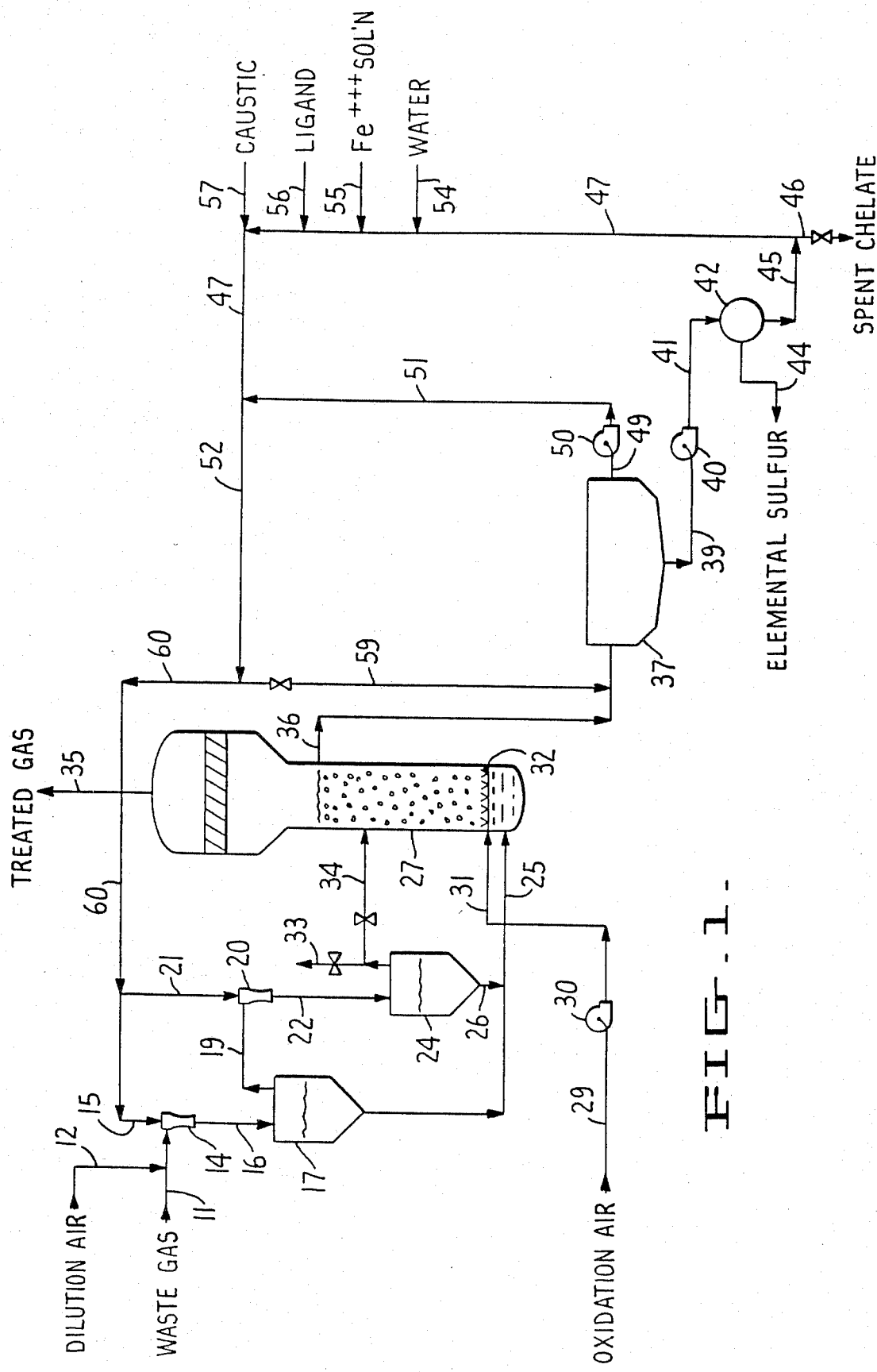
FIG. 1 is a schematic flow diagram of a process for hydrogen sulfide removal employing the two stage absorption and flotation recovery of the present invention.

This process can be used to remove sulfur values present in the form of hydrogen sulfide from gas streams containing as little as a few ppm of hydrogen sulfide (e.g., 10 ppm) up to and including streams that consist essentially of hydrogen sulfide, e.g., 90–100% $H_2$. However, it is rare to have, and thus to treat, such extremely diluted or concentrated streams in as petroleum refining or other industrial setting. Generally, such streams contain or are diluted to contain from about 0.1% to 70%, and preferably from about 1% to about 50% by volume and more preferably from about 5% to about 40% by volume of $H_2S$. Often, these streams contain minor sulfur values in the form of minor amounts (e.g., 1 ppm to 10% or 2% by volume) of volatile mercaptans which are also removed by this process. The other major component in these streams usually is air.

The process of this invention can be used to reduce these hydrogen sulfide levels to below 1 ppm or even below 0.01 ppm, the minimum limit of human olefactory detection.

The Chelate System

In accord with this invention a solution of a polyvalent metal in chelate form is contacted with the hydrogen sulfide-containing gas. The chelate solution, per se, does not constitute the present invention and may be selected from among the chelate solutions taught by the art to be useful in sulfur oxidation processes.

The metals which may be employed are those polyvalent metals which will oxidize sulfur to sulfur and in turn be reoxidized by oxygen or similar gas. Examples of these metals are iron and tin although other metals may be used with proper adjustment in concentration so that the algebraic sum of the single electrode potentials render the reaction thermodynamically possible.

The chelating agents or liquids which may be used in conjunction with polyvalent metallic cations are those which form a complex ion having enough stability in solution so that the concentration of, or activity of, the metal is sufficient to exceed the solubility product of the metal sulfide or hydroxide. These compounds may be of any substance which will effectively complex the metal ion by forming cyclic structures.

These materials include aminopolycarboxylic acid chelating agents of the alkylenediamine and phenylenediamine types, such as ethylenediamine tetracetic acid, nitrilotriacetic acid, or the like. They may also contain ammonia or an aliphatic, alicyclic, or heterocyclic primary or secondary amine.

Specific, nonlimiting examples of aminopolycarboxylic acids include diglycine, hydroxyethyldiglycine, nitrilotriacetic acid (NTA), carboxylic acid derivatives of ethylenediamine, diethylene triamine, 1,2-propylenediamine, and 1,3-propylenediamine, such as ethylenediamine tetracetic acid (EDTA), 2-hydroxyethyl ethylenediamine triacetic acid (HEDTA), diethylenetriamine pentacetic acid (DETPA), and carboxylic acid derivatives of cyclic 1,2-diamines such as 1,2-diaminocyclohexane-N, N-tetracetic acid, and 1,2-phenylenediamine-N,N-tetracetic acid. Salts of these acids, such as alkali metal salts, may also be used.

Metal chelate solutions used in practice of this invention have a total dissolved metal content of from about 0.01 to 2 moles of metal per liter or more, especially, 0.1 to 1.4 moles per liter. Preferably, the solution contains at least about 0.3 mole per liter, for example, about 0.4 to 1.0 mole per liter. The solution can be prepared from any suitable water soluble salt, e.g., a ferrous or ferric salt such as sulfate, chloride and nitrate salts, or from iron oxide or iron metal with the use of a suitable acid to bring the iron into solution.

The chelating agent is used in a proportion at least about 1 mole per mole (or gram atom) of metal in the solution. Preferably the chelating agent is incorporated in minor excess, for example, 5 to 50 mole percent excess, with respect to metal. Higher proportions of chelating agent may also be used.

The amount of $Fe^{+++}$ contacted with the $H_2S$-containing gas must be at least the amount required to react with the $H_2S$. It must be kept in mind that the dissolved iron is continuously being reoxidized to $Fe^{+++}$ so that the amount of $Fe^{+++}$ required is essentially a catalytic amount. The rate at which $Fe^{++}$ is oxidized to $Fe^{+++}$ depends upon temperature, agitation, contact time and other factors. The total $Fe^{+++}$ present as a combination of fed $Fe^{+++}$ and $Fe^{+++}$ generated by reoxidation should be at least the amount required to react with the sulfide and mercaptans and preferably is from about 150 to 300% of the amount required to react.

The system is usually run somewhat basic. This is controlled by adding caustic - such as KOH, NaOH, or $Na_2O$ or the like in controlled amounts. It is preferred to maintain the pH at from about 7 to about 10, more preferably pH 7.5 to 9.5.

Additional descriptions of typical chelate systems and their use may be found in the patents noted in The Prior Art. These descriptions are incorporated herein by reference.

The Process

Turning to FIG. 1, a petroleum processing waste gas, supplied via line 11 and having a large proportion of hydrogen sulfide - e.g., 725 kg out of a total flow of 750 kg/hour is admixed with dilution air from line 12 (about 1800 kg/hour) and fed to first stage jet eductor 14 where it is intimately contacted with an aqueous solution of HEDTA-$Fe^{+++}$ chelate complex supplied via line 15. The amount of HEDTA-$Fe^{+++}$ solution is very large relative to the mass of gas. (300,000 kg/hr of solution including about 9000 kg of $Fe^{+++}$ and 115,000 kg/hr of spent and active HEDTA.) This contacting causes oxidation of about half of the hydrogen sulfide to elemental sulfur with reduction of an equimolar amount of ferric ion to ferrous ion. The product of the contacting is passed through line 16 to phase separator 17 where the partially desulfurized gas stream is taken overhead via line 19 to second stage jet eductor 20 where it is intimately contacted with a second about 300,000 kg/hr stream of aqueous chelate solution supplied via line 21 so as to oxidize the remaining sulfide to sulfur. The product of this contacting is passed to phase separator 24. The condensed phase from separator 17 is withdrawn via line 25 and combined with the condensed phase drawn off via line 26 from separator 24. This condensed phase contains about 800–820 kg/hr of solid particulate sulfur in a total volume of about 600,000 kg/hr of liquid. This stream is fed into the lower portion of oxidationflotation tower 27 where it is contacted with about 12,000–13,000 kg/hr of upwardly flowing oxidation-flotation air supplied via line 29, blower 30 and line 31 to spargers 32 also located in the lower region of tower 27 typically about 9-10 feet below the top of the froth level in the column. This air flow provides a substantial molar excess of oxygen and reoxidizes the iron to the $Fe^{+++}$ state. It also provides flotation for the sulfur particles, carrying them upward as a solid-liquid-gas froth. The gas stream from separator 24 is about 2000 kg/hr in volume and is taken off and can be removed via valved line 34 and introduced into tower 27 about 3-4 feet below the top surface of the froth phase where it contacts the newly regenerated iron chelate solution for yet additional hydrogen sulfide removal, such as down to below 0.01 ppm, and also provides additional flotation of sulfur particles. The treated gas phase isolated via column 27 totals about 15,000 kg/hr and is removed via line 35 to vent or to further treatment, if desired. The froth phase is taken off via line 36 to multistage flotation unit 37 where about 600-700 kg/hr of solid sulfur is removed via line 39, pump 40 and line 41 as a concentrated suspension in about 16,000 kg/hr of liquid. Flotation unit 37 can be a motor driven induced air flotation unit. It can also be a forced draft flotation unit or other suitable equivalent. Here, additional air oxidation of ferrous ion occurs while colloidal sulfur in the liquid is floated to the surface by the action of air bubbles created by the rotating disperser in the liquid. Liquid flows via underflow baffles through each of four flotation cells. Froth formed is swept into side launder boxes by rotating paddle skimmers. Liquid leaving the final flotation cell contains less than 500 ppm of solid sulfur. The froth is optionally de-liquided such as in rotary filter 42 where a 30-40% solids content sulfur stream containing about 560 kg/hr of sulfur is removed via line 44. The liquid phase is removed via line 45. A portion of the liquid phase may be removed via line 46 for discard and/or recovery of its chelate values. This removal can be in the form of a continuous or periodic bleed. The bleed is required to limit build up of HEDTA and iron degradation products in the circulating chelate solution. In general terms, it is desired to maintain at least a 2/1 weight ratio of active HEDTA chelate to inactive chelate. The remainder of the liquid removed in rotary filter 42 is recycled via line 47.

The great majority of the liquid flow from column 27 to flotation unit 37 (i.e., about 300,000 kg/hr) is taken off as liquid from flotation unit 37 via line 49, pump 50 and line 51. This stream generally contains about 0.1% sulfur, although it is possible, by increasing the number of flotation stages, to essentially totally remove the sulfur, if desired. The liquid stream 51 is joined with the liquid stream in line 47 and recycled via line 52 optionally in part through valved line 59 to the flotation unit 37 but primarily via line 60 to lines 15 and 21 and jet eductors 14 and 20. Make up chelate feedstocks are added via lines 54, 55, 56 and 57 with the ferric salt being hydrated $Fe_2(SO_4)_3$.

Figure 2:
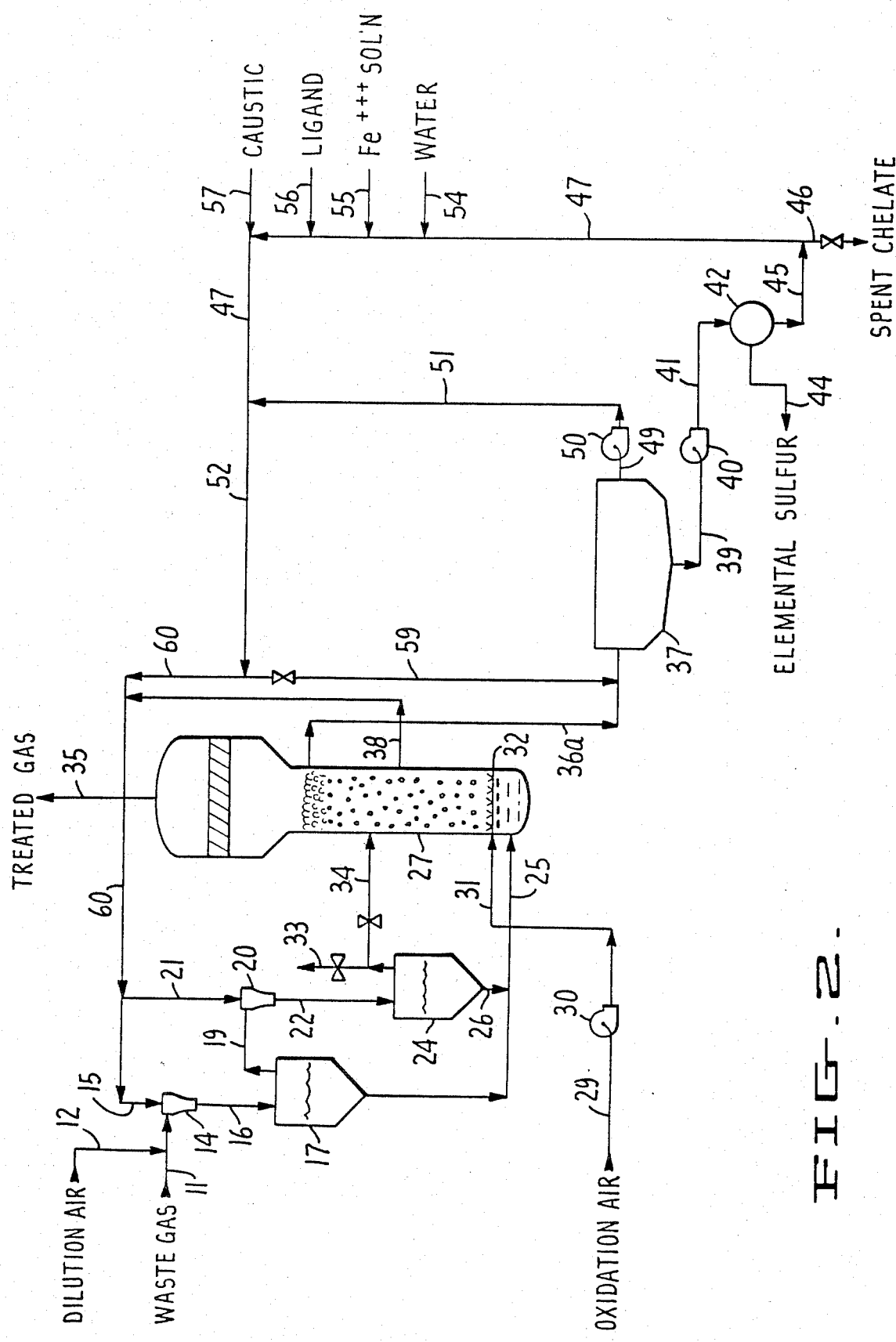
FIG. 2 shows a method whereby liquid throughput through the flotation stage is reduced.

In the process described with reference to FIG. 1, flotation separation occurs in column 27 and the entire froth plus liquid flow is taken off to flotation separator 37. If desired, additional advantage may be taken of the flotation separation which occurs in column 27 and the froth phase concentrated in solid sulfur and the liquid phase depleted in solid sulfur may be removed separately. This is illustrated in FIG. 2 wherein the froth phase is removed via line 36a to flotation unit 37 and a liquid phase relatively depleted in solid sulfur is removed via line 38 for recycle to the jet eductors 14 and 20 via line 60. With the system shown in FIG. 2, the flow through line 38 would be from about 20 to about 75% of the feed flow of line 25, with the remainder (80% to 25%) being removed via line 36a.

The process flow shown in FIG. 2 has the advantage of decreasing the flow through flotation cell 37 and thus permitting a decrease in equipment size and energy consumption in this cell. It presents a disadvantage in that the liquid withdrawn via line 38 and recycled generally contains more solid sulfur than does the liquid flow contained in line 51 and otherwise recycled so that there is some additional cycling of solid sulfur particles.

The foregoing process description is not to be construed as limiting the scope of this invention. This invention is instead to be defined by the following claims.

What is claimed is:

1. A continuous process for recovering sulfur values from a hydrogen sulfide-containing gaseous stream which comprises the steps of
   (a) contacting said hydrogen sulfide-containing gaseous stream with an aqueous solution of a water-soluble oxidized polyvalent metal chelate catalyst at alkaline pH thereby converting the hydrogen sulfide to particulate elemental sulfur and reducing the polyvalent metal chelate catalyst and forming a suspension of particulate elemental sulfur in said aqueous solution and a first product gas stream depleted in hydrogen sulfide,
   (b) contacting said suspension with free oxygen-containing gas in an oxidation zone under flotation conditions thereby oxidizing the polyvalent metal chelate to its oxidized form and forming a regenerated aqueous solution and introducing into the same oxidation zone into contact with the regenerated aqueous solution said first product gas stream thereby converting remaining hydrogen sulfide in said first product gas stream to elemental sulfur and forming a second product gas stream doubly depleted in hydrogen sulfide and an aqueous liquid phase containing the oxidized polyvalent metal chelate catalyst and a sulfur particle-gas-liquid foam phase,
   (c) separating the foam phase from the aqueous liquid phase,
   (d) recycling at least a portion of the aqueous liquid phase to the contacting step of (a), and
   (e) recovering elemental sulfur from the foam phase.

2. The process of claim 1 wherein the polyvalent metal is iron.

3. The process of claim 1 wherein in step (b) said flotation conditions include sparging free oxygen-containing gas upwards through said suspension.

4. The process of claim 3 wherein in step (c) said separating includes air flotation.

5. The process of claim 1 wherein said gaseous stream contains from about 5 to about 40% by volume of hydrogen sulfide.

6. The process of claim 1 wherein in step (a) said contacting is effected in a plurality of stages in series.

7. The process of claim 1 wherein the foam phase and the aqueous liquid phase are removed from the oxidation zone in separate streams.

* * * * *